Feb. 21, 1939. J. K. LUND 2,147,984
AIR VALVE
Filed Sept. 18, 1933
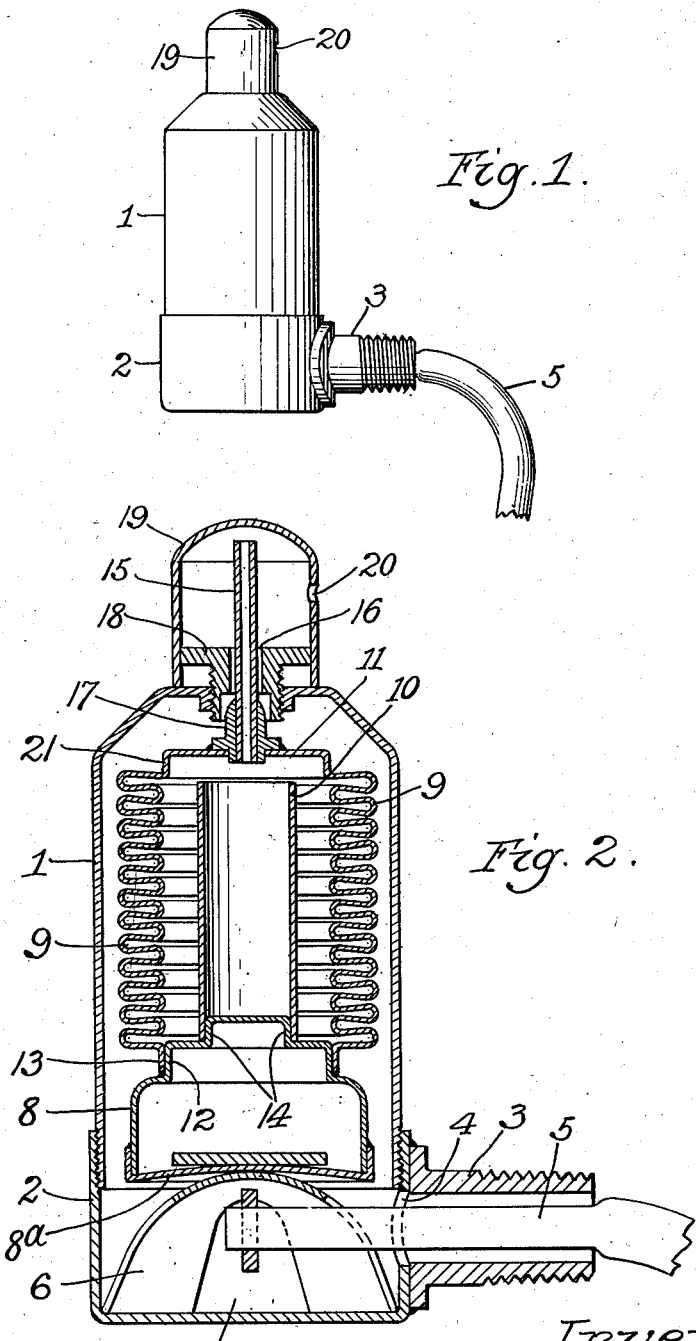
Inventor
James K. Lund
by Parker & Carter
Attorneys.

Patented Feb. 21, 1939

2,147,984

UNITED STATES PATENT OFFICE 2,147,984

AIR VALVE

James K. Lund, Chicago, Ill., assignor to The Dole Valve Company, Chicago, Ill., a corporation of Illinois Application September 18, 1933, Serial No. 689,841

8 Claims. (Cl. 236—61)

This invention relates to air valves for radiators and the like and has for its object to provide a new and improved device of this description. The invention has as a further object to provide an air valve which will prevent the escape of steam or water from the radiator and which will also close to maintain a vacuum in the system. The invention has further objects which are more particularly pointed out in the accompanying description.

Referring now to the drawing, Fig. 1 is a view of one form of air valve embodying the invention;

Fig. 2 is a vertical sectional view taken therethrough.

Like numerals refer to like parts throughout the several figures.

In the construction shown there is provided a casing which, as illustrated, is made up of the two sections 1 and 2 connected together in any suitable manner as by screw threads. The casing is provided with a threaded nipple 3 by means of which it is attached to the radiator. This nipple surrounds the opening 4 in the casing. A tube 5 projects through the nipple and through this opening and beneath an upstanding member 6 which is provided with a series of openings 7 communicating with the interior of the casing.

Within the casing is a receptacle 8 containing an expansible fluid which expands and contracts as the temperature thereof varies. This receptacle has a flexible bottom 8a so that the expansion of the material therein will push the top upwardly. Mounted upon the receptacle 8 is a bellows 9. This bellows has a sealed connection with the top of the receptacle 8, but there is no communication between the interior of the receptacle 8 and the bellows. Within the bellows is a stop device 10 which as shown consists of a tube which has one end on the top of the receptacle. The other end adapted to be engaged by the top 11 of the bellows when the bellows is collapsed its maximum amount.

In order to facilitate the construction I prefer to provide the receptacle 8 with the reduced portion 12 which is engaged by the lower end 13 of the bellows, the bellows being connected therewith so as to have an air tight connection. There is also a further reduced portion 14 which projects up into the tube 10 so as to hold it against lateral movement. The tube 10 is not connected with the bellows but there is a free communication between all of the folds thereof.

Connected with the top of the bellows is a hollow member or tube 15 which connects the interior of the bellows with the outside atmosphere. This tube passes up through a seating member 16 attached to the casing 1. There is a valve 17 surrounding the tube 15 which, when the bellows is expanded, engages the seating member 16 so as to close the communication between the casing and the outside atmosphere. The seating member 16 is preferably screw threaded into the upper end of the casing 1 and has an enlarged end 18 on the outside of the casing. A cap 19 covers the tube 15 and the seating member 16. This cap is provided with a series of openings 20 communicating with the outside atmosphere.

The combined receptacle 8 and bellows 9 act as a float when water enters the casing so as to close the valve 17. The valve 17 is also closed by the external pressure of the atmosphere when pressure in the casing and the system falls below atmospheric pressure so as to maintain the vacuum.

I prefer to provide the bellows at the top of the reduced portion 21, the tube being connected with this reduced portion.

The use and operation of my invention are as follows:

When the valve is in use it is attached by means of the nipple 3 to the radiator. When the valve is in position and water passes into the casing, this water causes the receptacle 8 and bellows to act as a float and move upwardly and close the valve 17, thus closing the opening leading from the casing to the atmosphere. When steam enters the casing 1 and heats the fluid in the receptacle, it expands and moves the bellows up to cause the valve 17 to be closed. When pressure in the system falls below atmospheric pressure the pressure in the casing 1 surrounding the bellows is lower than the atmospheric pressure. The atmospheric pressure entering into the interior of the bellows through the pipe 15 causes the bellows to expand and close the valve 17 so as to maintain this vacuum. When the pressure in the casing becomes equal to the outside atmospheric pressure or greater than the outside atmospheric pressure, this pressure is exerted on the outside of the bellows and causes it to collapse to open the valve 17. The collapsing movement of the bellows is limited by the pipe 10.

When the expansible material in the receptacle 8 is expanded and the bellows and valve 17 moved upwardly to cause the valve 17 to close, the passageway leading from the casing 1 to the external atmosphere, the upper end of the tube 10 engages the top of the bellows so as to insure the valve 17 being held tightly closed and so as to remove the strain of the pressure of the expansible fluid from the bellows.

I claim:

1. An air valve comprising a casing, a float therein comprising a closed receptacle, a bellows fastened to said receptacle, a pipe connected with said bellows and projecting through an opening in the casing to the exterior thereof, the pipe connecting the exterior atmosphere with the interior of the bellows, and a valve connected with said bellows for controlling the opening leading from the casing to the atmosphere, whereby when the pressure inside the casing falls below atmospheric pressure the bellows will expand and move said valve to close the opening in the casing leading to the exterior atmosphere.

2. An air valve comprising a casing, a float therein comprising a closed receptacle, a bellows fastened to said receptacle, a pipe connected with said bellows and projecting through an opening in the casing to the exterior thereof, the pipe connecting the exterior atmosphere with the interior of the bellows, and a valve connected with said bellows for controlling the opening leading from the casing to the atmosphere, whereby when the pressure inside the casing falls below atmospheric pressure the bellows will expand and move said valve to close the opening in the casing leading to the exterior atmosphere, a tube within the bellows engaging the top of said receptacle, said tube engaging the top of the bellows when it is collapsed to limit its collapsing movement.

3. An air valve comprising a casing, a receptacle within said casing containing an expansible fluid, a bellows connected with said receptacle, a passageway leading from the casing to the exterior atmosphere, a valve connected with said bellows for closing said passageway when the expansible fluid in said receptacle is expanded and a passageway leading from the exterior atmosphere to the interior of said bellows.

4. An air valve comprising a casing, a receptacle within said casing containing an expansible fluid, a bellows connected with said receptacle, a passageway leading from the casing to the exterior atmosphere, a valve connected with said bellows for closing said passageway when the expansible fluid in said receptacle is expanded, a member on the interior of said bellows which engages the upper part of the bellows when said expansible material is expanded so as to remove the strain of the pressure of said expanding material from said bellows.

5. In a valve, a casing having a seat, a hollow valve adapted to engage the seat, a bellows connected to the valve, a thermostatic container supporting the bellows, and means inside of the bellows for limiting its collapse, substantially as described.

6. In a steam radiator valve, a valve casing having a seat, a valve adapted to engage the seat, a thermostatic container to close the valve in the presence of heat, a bellows of inherent coil spring tendencies which engages the thermostatic container and tends to close the valve when pressure in the valve casing is less than pressure in the bellows, means for always admitting atmospheric air pressure to the bellows, and means for preventing excessive collapse of the bellows in the presence of external pressure.

7. In a steam radiator valve, a valve casing having a seat, a valve adapted to engage the seat, a thermostatic container sensitive to heat and a pressure sensitive member floating as a unit in the casing and connected one to the other and to the valve, and means for admitting atmospheric air to the interior of the pressure sensitive member.

8. In an air valve, a casing having a seat, a valve adapted to engage the seat, a spring urging the valve towards the seat and adapted to yield to open the valve under air pressure, an actuating member responsive to heat, means actuated by said member for transmitting closing tendency through the spring to the valve and for preventing yielding of the spring by pressure accompanying the heat.

JAMES K. LUND.